Figure 1:
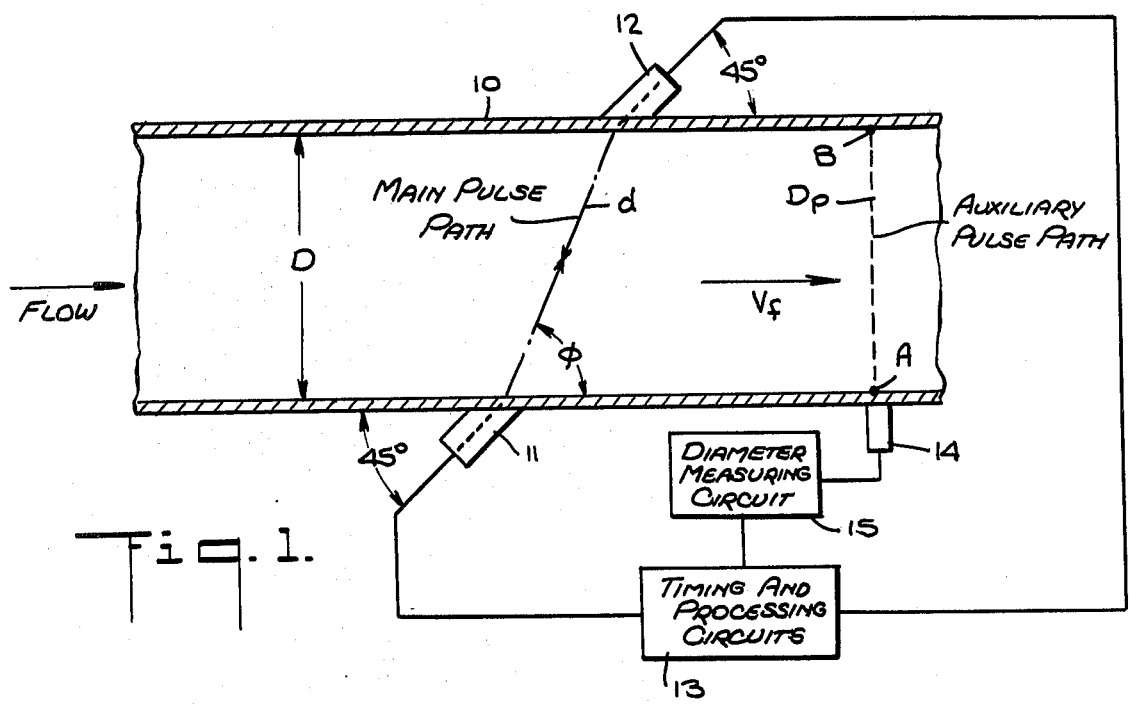

United States Patent [19]

Soltz

[11] 4,397,194
[45] Aug. 9, 1983

[54] ULTRASONIC FLOWMETER INCLUDING MEANS TO MEASURE PIPE GEOMETRY

[75] Inventor: Daniel J. Soltz, Norristown, Pa.

[73] Assignee: Fischer & Porter Company, Warminster, Pa.

[21] Appl. No.: 251,928

[22] Filed: Apr. 7, 1981

[51] Int. Cl.$^3$ .............................................. G01F 1/66
[52] U.S. Cl. .................................... 73/861.28; 73/227
[58] Field of Search ... 73/227, 861.18, 861.25–861.29; 128/663

[56] References Cited

U.S. PATENT DOCUMENTS

| | | | |
|---|---|---|---|
| 3,498,290 | 3/1970 | Shaw et al. ....................... | 73/227 X |
| 3,575,050 | 4/1971 | Lynnworth ....................... | 73/861.27 |
| 3,869,915 | 3/1975 | Baumoel ........................... | 73/861.28 |
| 4,049,954 | 9/1977 | Vieira et al. ..................... | 364/560 |
| 4,098,117 | 7/1978 | Baumdel .......................... | 73/861.18 |
| 4,312,238 | 1/1982 | Rey .................................. | 73/861.28 |

FOREIGN PATENT DOCUMENTS

55-141616  11/1980  Japan .................................... 73/227

*Primary Examiner*—Charles A. Ruehl
*Attorney, Agent, or Firm*—Michael Ebert

[57] ABSTRACT

An ultrasonic flowmeter for measuring the flow rate of fluid conducted through a pipe, the meter including a pair of alternately-excited transducers, one being placed at an upstream and the other at a downstream pipe position. An acoustic pulse transmitted by one transducer and propagated through the fluid at an angle to the longitudinal flow axis is received by the other transducer. The time delay difference between the upstream and downstream transit times which depends on flow velocity is determined to provide a flow rate reading. Since the geometry of the pipe is a major factor in flow rate measurement, to factor-in this geometry, a third transducer or one of the pair is arranged to produce an auxiliary acoustic pulse that is propagated in a direction normal to the flow axis to produce a first echo at the interface of the inner pipe surface and the fluid on the transducer side, and to produce a second echo at the diametrically opposed side of the pipe, these echoes being received by the same transducer. The internal diameter of the pipe is then determined by measuring the difference between the transit times of these echoes.

7 Claims, 2 Drawing Figures

ULTRASONIC FLOWMETER INCLUDING MEANS TO MEASURE PIPE GEOMETRY

BACKGROUND OF INVENTION

This invention relates generally to ultrasonic systems for measuring the flow of liquid through a pipe, and in particular to a system which includes means to determine the geometry of the flow pipe and to factor-in the geometry in the flow rate measurement.

The use of ultrasonic techniques to determine the flow rate of a liquid flowing through a pipe is well known. Among patents disclosing systems of this type are U.S. Pat. Nos. 4,103,551; 4,004,461 and 3,906,791. Typically, in an ultrasonic system adapted to measure flow rate, a pulse of ultrasonic energy is alternately emitted by a pair of transducers; one transducer being placed upstream on the pipe at one end of a tilted diameter or diagonal, the other being placed downstream at the other end of the diagonal. The direction of tilt lies in the direction of flow.

A pulse of ultrasonic energy emitted by one transducer and propagated through the fluid being metered at an angle to the longitudinal flow axis is detected by the other transducer. The time delay difference (that is, the upstream time minus the downstream time) between the generation of the emitted pulses and their reception is a function of flow velocity, and therefore may be converted into a flow rate reading.

In order to maintain the required non-normal angle between the longitudinal axis of the fluid flowing in the pipe and the sonic velocity vector, it is often the practice to mount each ultrasonic transducer within a pocket protruding into the pipe. Such protrusions are objectionable, for they disturb the local flow velocity profile in the region in which measurements are to be made, and also create a collection point for solids dispersed in the liquid. Other ultrasonic flowmeters employ oblique or wedge injection techniques to obviate the need for pockets. Thus in the U.S. Pat. No. 4,195,517 to Kalonoski et al., each crystal transducer is coupled to the pipe by means of a wedge-shaped sonic probe of stainless steel or other solid material capable of transmitting acoustic pulses.

In the Kalinoski et al. U.S. Pat. No. 4,195,517, whose entire disclosure is incorporated herein by reference, a pair of transducers is mounted externally on the same side of the pipe, each transducer, in turn, being physically coupled to a sonic probe which transmits and receives generated acoustic pulses between the transducers through the flowing fluid. The transducers and probes are arranged so that the acoustic pulses enter the pipe at one side thereof at an oblique angle to the solid-fluid interface, at which point refraction occurs. The pulses then propagate through the fluid to the opposite wall of the pipe where they are reflected toward the other transducer.

In the Kalinoski et al. system, the acoustic path through the fluid is determined for a given set of conditions by the ratio of the velocity of sound in the probe and the velocity of sound in the fluid in accordance with Snell's Law. The transducers are excited sequentially to produce acoustic pulses which first travel from the upstream to the downstream transducer and then in the reverse direction. A gated counter measures the respective sonic propagation times between the two transducers. The functions of exciting the transducers, measuring the sonic propagation times, reading the values of process and geometric parameters, and making the necessary calculations are carried out by digital techniques employing a microprocessor.

The geometry of the flow pipe is a major factor in ultrasonic volumetric flow measurement. Ultrasonic meters of the clamp-on type usually assume a nominal geometry; and if this assumption is correct, the flow rate measurements are accurate to the extent that the system is capable of providing a reading that is linearly proportional to flow rate. But since in actual practice, pipe tolerances vary from installation to installation, this uncertainty may give rise to gross errors, particularly in those installations where corrosion and scaling of the pipe has occurred.

SUMMARY OF INVENTION

In view of the foregoing, the main object of this invention is to provide an ultrasonic flowmeter which includes ultrasonic means to determine the geometry of the pipe as an integral part of the flowmeter system.

More particularly, an object of this invention is to provide in an ultrasonic flowmeter, means to propagate an auxiliary acoustic pulse through the flow pipe along a path normal to the longitudinal flow axis thereof and to receive a first echo produced at the interface of the inner pipe surface and the fluid on one side of the pipe, and a second echo produced at the diametrically opposed side, whereby the pipe geometry may then be determined by measuring the difference in transit times between the two echoes.

Also an object of this invention is to provide means of the above type for determining the pipe geometry and factoring it into the flow measurement, which means includes a third transducer coupled to the pipe to generate the auxiliary acoustic pulse.

Still another object of this invention is to provide means of the above type in an ultrasonic flowmeter having a pair of transducers acoustically coupled to the pipe by respective wedges, which means makes use of one of these transducers and a specially shaped wedge to propagate auxiliary ultrasonic pulses in a diametrical path.

Yet another object of the invention is to provide an ultrasonic flowmeter of the clamp-on type which affords more accurate readings than meters which merely assume a nominal pipe geometry.

Briefly stated, these objects are attained in an ultrasonic flowmeter for measuring the flow rate of fluid conducted through a pipe, the meter including a pair of alternately-excited transducers, one placed at an upstream and the other at a downstream pipe position. An acoustic pulse transmitted by one transducer and propagated through the fluid at an angle to the longitudinal flow axis is received by the other transducer. The time delay difference between the upstream and downstream transit times which depends on flow velocity is determined.

Since the geometry of the pipe is a major factor in flow rate measurement, to factor-in this geometry, a third transducer or one of the pair is arranged to produce an auxiliary acoustic pulse that is propagated in a direction normal to the flow axis to produce a first echo at the interface of the inner pipe surface and the fluid on the transducer side, and to produce a second echo at the diametrically opposed pipe surface, these echoes being received by the same transducer. The internal diameter of the pipe is then determined by measuring the difference between the transit times of these echoes.

OUTLINE OF DRAWINGS

Figure 2:
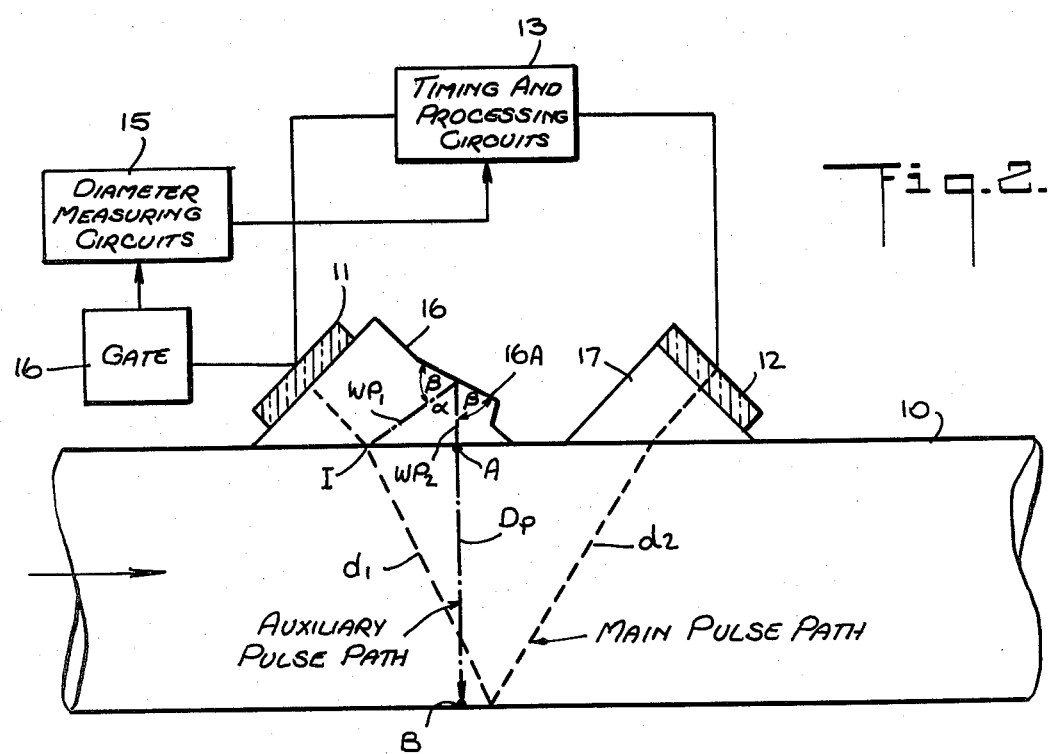

For a better understanding of the invention as well as other objects and further features thereof, reference is made to the following detailed description to be read in conjunction with the accompanying drawings, in which:

FIG. 1 schematically illustrates an ultrasonic flowmeter in accordance with the invention which includes a third transducer to determine the geometry of the pipe; and FIG. 2 schematically illustrates an ultrasonic flowmeter in accordance with the invention in which a pair of transducers are coupled to the pipe on one side thereof through wedges, one of which wedges is specially shaped to facilitate the determination of the pipe geometry without the use of a third transducer.

DESCRIPTION OF INVENTION

First Embodiment

Referring now to FIG. 1, there is shown a pipe 10 through which a fluid to be metered is conducted in the direction indicated by the arrow. Mounted on one side of the pipe at 45 degrees or other suitable angle is a first transducer 11. Mounted on the opposite side of the pipe at a downstream position at a 45 degree angle is a second transducer 12.

Transducers 11 and 12 are alternately excited to generate ultrasonic energy. When upstream transducer 11 is excited, it emits an acoustic pulse which is propagated through the fluid in pipe 10 in a path at an angle to the longitudinal flow axis thereof and picked up by downstream transducer 12. When transducer 12 is excited, acoustic energy is propagated in the reverse direction along the same path and picked up by transducer 11.

Since the circuits for alternately exciting the transducers at timed intervals and for processing the received signals to measure the difference in the upstream and downstream transit times to determine the flow rate are well known, these circuits are generally represented by block 13.

Volumetric flow through a pipe is the product of average flow velocity times the cross sectional area A of the pipe. For round pipes, $A = \pi D^2/4$; where D is the inside diameter of the pipe. Because of the square relationship between D and A, diameter errors have a significant effect on volumetric flow measurements. Thus a 2% diameter error will cause about a 4% volumetric error.

We shall now briefly outline the principles involved in ultrasonic flow rate measuring techniques with respect to a pipe having a diameter D with a flow therethrough having a velocity $V_f$ in the direction in FIG. 1. The fluid conducted through the pipe has a sound velocity C determined by its physical constants and also influenced by such variables as pressure and temperature. While it is known to provide means to compensate for these variables, they are not the concern of the present invention.

When there is zero flow in pipe 10, a short burst of ultrasonic energy emitted by upstream transducer 10 will traverse the pipe at the sound velocity C and at an angle $\phi$ relative to the direction of flow. The same condition exists with respect to a pulse emitted by downstream transducer 12.

As flow is increased from zero, the downstream velocity $V_D$ of acoustic energy emitted by transducer 11 will be increased, whereas the upstream velocity $V_U$ will be decreased. It follows, therefore, that if $V_D$ and $V_U$ can be measured and the angle $\phi$ is known, the flow velocity $V_f$ can be determined independently of the sound velocity C of the fluid. The flow velocity $V_f$ is expressed by the following equation:

$$V_f = (V_d - V_U)/2 \cos \phi$$

The determination of $V_D$ and $V_U$ can be carried out by measuring the time of travel $(t_u + t_d)$ of an ultrasonic pulse in both directions, but only if one knows the distance (d) travelled in the upstream and downstream directions. Distance d is related to the pipe internal diameter as follows:

$$d = D/\sin\phi$$

Thus unless one precisely knows the pipe internal diameter, one cannot accurately determine the value of distance d, the resultant measurement error depending on the extent to which the internal diameter is misjudged.

In order, therefore, to accurately measure the internal diameter D of pipe 10 and to factor-in this measurement in the ultrasonic flowmeter, there is provided a third ultrasonic transducer 14 which is clamped or otherwise mounted on the exterior of the pipe adjacent the transducer pair. Transducer 14 is arranged, when excited, to produce an auxiliary acoustic pulse which is propagated through the pipe in a diametrical path $D_p$ normal to the longitudinal flow axis of the pipe.

Thus the emitted auxiliary pulse from transducer 14 must first travel through the wall of the pipe, the pulse then travelling along path $D_p$ in the fluid until it strikes the inner surface of the pipe wall at a diametrically opposed position.

Two echoes are produced as a result of this action; the first echo being produced at point A at the near end of path $D_p$ at the interface of the pipe wall and the fluid, the second echo being produced at point B at the far end of path $D_p$. The first and second echoes are picked up by transducer 14 which also acts as a receiving transducer.

The first echo from the near end will, of course, be received before the second echo from the far end. The difference in transit times between the two echoes is proportional to the internal diameter D of the pipe in accordance with the equation:

$$D = t/2C;$$

where t is the time displacement between the first and second echoes, and C is the velocity of sound in the medium.

The excitation of transducer 14 and the processing of the echoes to determine the value of diameter D are carried out by circuits 15 which are generally similar to circuits 13 and includes gating means to reject signals other than the echo signals to provide a count of the D value. This count is applied to the microprocessor included in circuits 13 so that the D value of the pipe can be factored in to determine the exact distance d travelled by the acoustic measuring pulses in the ultrasonic flowmeter.

Thus the microprocessor does not make its computation on the basis of an assumed nominal diameter value but on a measured value to provide a more accurate indication of flow rate.

Second Embodiment

In the arrangement shown in FIG. 2, the upstream and downstream transducers 11 and 12 are mounted externally on the same side of pipe 10, transducer 11 being coupled to the pipe by a wedge 16 and a transducer 12 being coupled to the pipe by a wedge 17. These sonic wedges, which may be of polystyrene, act to convey acoustic energy at the appropriate angle. In practice, the transducers are clamped under pressure to the wedges to assure maximum electro-acoustic conversion efficiency.

The wedges in this arrangement function in one respect in essentially the same manner as the probes having wedge formations disclosed in the above-identified Kalinoski et al. patent. Thus when transducer 11 is excited, wedge 16 acts as an intermediate transmission medium directing the acoustic pulse into the fluid at an appropriate angle along path $d_1$ for reflection at the opposite side of the pipe, the reflected pulse travelling on path $d_2$ being picked up by transducer 12. And when transducer 12 is excited, then wedge 17 acts as the transmission medium.

The ultrasonic pulse transmitted through wedge 16 associated with transducer 11 which is pressed against the exterior of pipe 10 not only goes through the wall of the pipe but is also reflected at the interface point I between the wedge and the pipe. The resultant auxiliary pulse is directed along a wedge path $WP_1$ toward a sloped face section 16A of the wedge, from which it is reflected back toward the pipe along a wedge path $WP_2$, the auxiliary pulse then traversing the pipe along the diametrical path $D_p$ which extends between points A and B. Point I is on the inner surface of the pipe wall adjacent wedge 16, and point B is on the diametrically-opposed inner surface of the pipe wall. The slope of face section 16A is such as to cause the auxiliary pulse path $D_p$ to be normal to the longitudinal flow axis of the tube.

Thus, just as in the case of FIG. 1 where a separate transducer is used, a first echo of the auxiliary pulse is produced at the near end A of path $D_p$ which is the interface of the inner surface of the pipe and the fluid, and a second echo is produced at the far end of path $D_p$. It is to be noted that while in FIG. 2, to simplify the showing, interface I and interface point A appear to be in the same plane, actually, interface I is on the outside of the pipe and interface A on the inside thereof.

Thus transducer 11, after it has transmitted an auxiliary pulse, functions to receive the first and second echoes of the auxiliary pulse. To segregate these echoes from the ultrasonic pulses propagated along fluid paths $d_2$ and $d_1$ and received by transducer 11, a gate 16 is provided which admits only the first and second echoes to the measuring circuit 16 which determines the time displacement between the echoes to provide a reading of the internal diameter of the pipe.

Thus in this embodiment, one is able to determine the geometry of a pipe having an ultrasonic flow measuring system coupled thereto without the need for an additional transducer.

While there have been shown and described preferred embodiments of an ultrasonic flowmeter including means to measure pipe geometry in accordance with the invention, it will be appreciated that many changes and modifications may be made therein without, however, departing from the essential spirit thereof. Thus a probe may be mounted on the pipe to sense the temperature of the fluid being metered to provide a temperature-dependent signal which is applied to the diameter measuring circuit to compensate for the influence of this variable on the sound velocity.

I claim:

1. An ultrasonic flowmeter for measuring the flow rate of a fluid conducted through a pipe whose internal diameter is not exactly known, the flowmeter comprising:
   A. a pair of transducers mounted on the exterior of said pipe at upstream and downstream positions;
   B. means to alternately excite the upstream and downstream transducers whereby an acoustic pulse emitted by the excited transducer is propagated through the fluid along a path within the pipe whose length depends on the distance between the transducers at an angle to the longitudinal flow axis of the pipe and is received by the other transducer;
   C. a flow rate measuring system coupled to the transducers to determine the time delay differences between the upstream and downstream transit times along said path to derive therefrom the flow velocity of the fluid;
   D. means to generate an auxiliary acoustic pulse that is propagated in a direction normal to the flow axis to produce a first echo at the interface of the inner surface of the pipe and the fluid on one side of the pipe and a second echo at the interface of the inner surface of the pipe and the fluid at the diametrically-opposed side; and
   E. means to detect said first and second echoes and to measure the difference between the travel times of said echoes to determine the inner diameter of the pipe and to apply the value thereof to said flow rate measuring system whereby said inner diameter can be factored into the flow rate measurement to determine the actual length of the path within the pipe.

2. A flowmeter as set forth in claim 1, wherein said transducers are mounted on opposite sides of the pipe.

3. A flowmeter as set forth in claim 1, wherein said means to generate an auxiliary acoustic pulse includes a third transducer.

4. A flowmeter as set forth in claim 3, wherein said means to measure the difference between the travel times of said echoes includes a measuring circuit coupled to said third transducer to determine the value of the internal diameter and to apply said value to said measuring system.

5. A system as set forth in claim 1, wherein said transducers are mounted on the same side of the pipe.

6. A system as set forth in claim 5, wherein said transducers are coupled to said pipe through wedges which apply the acoustic pulse to the pipe at a non-normal angle.

7. A system as set forth in claim 6, wherein one of said wedges has a sloped face whereby said auxiliary pulse is generated by reflection from the interface of the wedge and the pipe and is directed toward said face and reflected thereby toward said pipe in a direction normal to the flow axis to produce said first and second echoes.

* * * * *